(12) United States Patent
Yamamoto

(10) Patent No.: US 11,980,945 B2
(45) Date of Patent: May 14, 2024

(54) CUTTING INSERT, CUTTING TOOL, AND METHOD FOR MANUFACTURING MACHINED PRODUCT

(71) Applicant: KYOCERA CORPORATION, Kyoto (JP)

(72) Inventor: Keisuke Yamamoto, Moriyama (JP)

(73) Assignee: KYOCERA CORPORATION, Kyoto (JP)

( * ) Notice: Subject to any disclaimer, the term of this patent is extended or adjusted under 35 U.S.C. 154(b) by 420 days.

(21) Appl. No.: 17/598,876

(22) PCT Filed: Mar. 23, 2020

(86) PCT No.: PCT/JP2020/012725
§ 371 (c)(1),
(2) Date: Sep. 28, 2021

(87) PCT Pub. No.: WO2020/203414
PCT Pub. Date: Oct. 8, 2020

(65) Prior Publication Data
US 2022/0176461 A1 Jun. 9, 2022

(30) Foreign Application Priority Data
Mar. 29, 2019 (JP) .................................. 2019-065771

(51) Int. Cl.
*B23B 27/04* (2006.01)
*B23B 27/22* (2006.01)

(52) U.S. Cl.
CPC ............ *B23B 27/045* (2013.01); *B23B 27/22* (2013.01); *B23B 2200/081* (2013.01); *B23B 2200/323* (2013.01)

(58) Field of Classification Search
CPC . B23B 27/045; B23B 27/22; B23B 2200/323; B23B 27/143;
(Continued)

(56) References Cited

U.S. PATENT DOCUMENTS 4,583,887 A * 4/1986 Wertheimer ............ B23C 5/006
407/116
4,969,779 A * 11/1990 Barten .................. B23B 27/045
407/115
(Continued)

FOREIGN PATENT DOCUMENTS

DE 102019121468 A1 * 2/2021 ........... B23B 27/045
JP 2017196693 A 11/2017

*Primary Examiner* — Sara Addisu
(74) *Attorney, Agent, or Firm* — HAUPTMAN HAM, LLP

(57) ABSTRACT

A cutting insert may include an upper surface, a lower surface, a front cutting edge and a first lateral cutting edge. The upper surface may include a breaker protrusion. The first lateral cutting edge may include an inclined part which is closer to the lower surface as going away from the front cutting edge. The breaker protrusion may include a first region, a second region and a third region. The first region may be located further away from the lower surface than the inclined part. The second region may be located closer to the front cutting edge than the first region, and may be located closer to the lower surface than the inclined part. The third region may be located further away from the front cutting edge than the first region, and may be located closer to the lower surface than the inclined part.

12 Claims, 15 Drawing Sheets

(58) Field of Classification Search
CPC ...... B23B 2200/0447; B23B 2200/081; B23B 200/202; B23B 2200/369; B23B 2226/125; B23B 2226/315; B23B 27/1611; B23B 27/1607; B23B 29/043; B27B 27/04

See application file for complete search history.

(56) References Cited

U.S. PATENT DOCUMENTS

| | | | | |
|---|---|---|---|---|
| 5,676,495 | A * | 10/1997 | Katbi | B23B 27/045 407/115 |
| 5,725,334 | A * | 3/1998 | Paya | B23B 27/065 407/104 |
| 7,320,564 | B2 * | 1/2008 | Gati | B23B 27/005 407/115 |
| 9,925,595 | B2 * | 3/2018 | Tsuda | B23B 27/045 |
| 10,384,268 | B1 * | 8/2019 | Kertsman | B23B 27/045 |
| 11,161,178 | B2 * | 11/2021 | Kusuda | B23B 27/16 |
| 2012/0210834 | A1 * | 8/2012 | Onodera | B23B 27/045 407/100 |
| 2014/0147219 | A1 * | 5/2014 | Kaufmann | B23B 27/10 407/11 |
| 2017/0106451 | A1 * | 4/2017 | Inoue | B23B 27/045 |
| 2019/0022762 | A1 * | 1/2019 | Kusuda | B23B 27/007 |
| 2019/0143419 | A1 * | 5/2019 | Shimanuki | B23B 27/045 82/123 |
| 2020/0206824 | A1 * | 7/2020 | Suzuki | B23B 27/045 |
| 2021/0260669 | A1 * | 8/2021 | Fukuhara | B23B 27/1611 |
| 2022/0143713 | A1 * | 5/2022 | Steinhilber | B23B 27/1607 |

* cited by examiner

CUTTING INSERT, CUTTING TOOL, AND METHOD FOR MANUFACTURING MACHINED PRODUCT

CROSS-REFERENCE TO RELATED APPLICATION

The present application is a national stage entry according to 35 U.S.C. 371 of PCT Application No. PCT/JP2020/012725 filed on Mar. 23, 2020, which claims priority to Japanese Patent Application No. 2019-065771, filed Mar. 29, 2019. The contents of this application are incorporated herein by reference in their entirety.

TECHNICAL FIELD

The present disclosure may generally relate to a cutting insert for use in a cutting process of a workpiece. Examples of the cutting process may include turning process and milling process. Examples of the turning process may include outer diameter process, inner diameter process, grooving process and cut-off process.

BACKGROUND

For example, a cutting insert is discussed in Japanese Unexamined Patent Application Publication No. 2017-196693 (Patent Document 1) as a cutting insert for use in a cutting process of a workpiece, such as metal. The cutting insert discussed in Patent Document 1 may include a base composed of a hard alloy, and a blade part composed of diamond. The blade part may include a chip breaker recess.

A height of an upper end of a breaker wall surface in the chip breaker recess may be identical with a height of a cutting edge in the cutting insert discussed in Patent Document 1. Chips generated by the cutting edge can easily climb over the breaker wall surface. Consequently, breaking effect on the chips by the breaker wall surface may become insufficient.

SUMMARY

A cutting insert in a non-limiting aspect of the present disclosure may include an upper surface, a lower surface, a front end surface, a first lateral surface, a second lateral surface, a front cutting edge, a first lateral cutting edge and a second lateral cutting edge. The lower surface may be located on a side opposite to the upper surface. The front end surface may be located between the upper surface and the lower surface. The first lateral surface may be adjacent to the upper surface and the front end surface. The second lateral surface may be located on a side opposite to the first lateral surface, and may be adjacent to the upper surface and the front end surface. The front cutting edge may be located on an intersection of the upper surface and the front end surface. The first lateral cutting edge may be located on an intersection of the upper surface and the first lateral surface. The second lateral cutting edge may be located on an intersection of the upper surface and the second lateral surface.

The upper surface may include a front rake surface, a first lateral rake surface and a breaker protrusion. The front rake surface may be located along the front cutting edge, and may be closer to the lower surface as going away from the front cutting edge. The first lateral rake surface may be located along the first lateral cutting edge, and may be closer to the lower surface as going away from the first lateral cutting edge. The breaker protrusion may be located further away from the first lateral cutting edge than the first lateral rake surface, and may be extended along the first lateral rake surface. The first lateral cutting edge may include an inclined part which may be closer to the lower surface as going away from the front cutting edge.

The breaker protrusion may include a first region, a second region and a third region. In a side view from a side of the first lateral surface, the first region may be located further away from the lower surface than the inclined part. The second region may be located closer to the front cutting edge than the first region, and may be located closer to the lower surface than the inclined part. The third region may be located further away from the front cutting edge than the first region, and may be located closer to the lower surface than the inclined part.

EMBODIMENTS

<Cutting Inserts>

Figure 1:
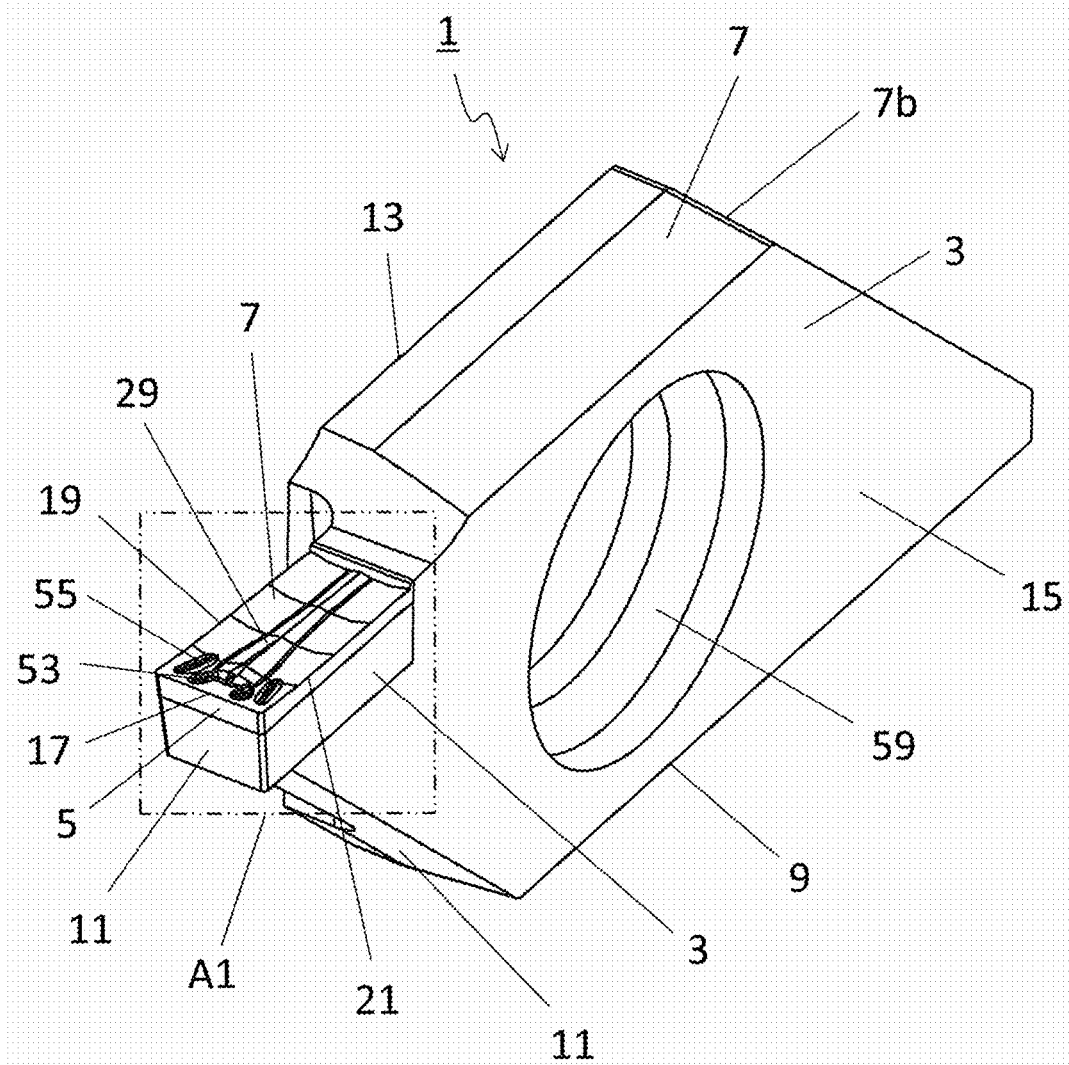
FIG. 1 is a perspective view illustrating a cutting insert in a non-limiting embodiment.

Cutting inserts 1 (hereinafter also referred to simply as "inserts 1") in non-limiting embodiments of the present disclosure may be described in detail below with reference to the drawings. For the sake of description, the drawings referred to in the following may illustrate, in simplified form, only main members necessary for describing the embodiments. Hence, the cutting inserts 1 may include any arbitrary structural member not illustrated in the drawings referred to. Dimensions of the members in each of the drawings may faithfully represent neither dimensions of actual structural members nor dimensional ratios of these members.

The insert 1 in a non-limiting embodiment may be usable for a so-called grooving process. The insert 1 may be formed by one member, or may include a base 3 and a cutting part 5 as in an embodiment illustrated in FIG. 1. The insert 1 may include the base 3 and the cutting part 5, and may have an approximately polygonal plate shape as a whole. Specifically, the insert 1 may have a quadrangular plate shape as in the embodiment illustrated in FIG. 1.

For example, cemented carbide, cermet and ceramics may be usable as a material of the base 3. Examples of composition of the cemented carbide may include WC (tungsten carbide)-Co, WC—TiC (titanium carbide)-Co and WC—TiC—TaC (tantalum carbide)-Co.

As used herein, WC, TiC and TaC may be hard particles, and Co may be a binding phase. The cermet may be a sintered composite material obtainable by compositing metal into a ceramic component. Examples of the cermet may include compounds composed mainly of TiC or TiN (titanium nitride). Of course, it should be clear that the material of the base 3 is not limited to these materials.

Examples of material of the cutting part 5 may include cemented carbide, PCD (polycrystalline diamond) and cBN (cubic boron nitride). Of course, it should be clear that the material of the cutting part 5 is not limited to these materials.

In cases where the material of the cutting part 5 is, for example, the PCD or cBN and has higher hardness than the base 3, it may be possible to enhance durability of the insert 1 while reducing manufacturing costs than cases where the insert 1 is entirely composed of PCD or cBN.

The cutting part 5 may be joined to the base 3. For example, the cutting part 5 may be joined to the base 3 by using a joining member, such as a brazing material. Alternatively, the cutting part 5 may be joined by being sintered integrally with the base 3.

Figure 2:
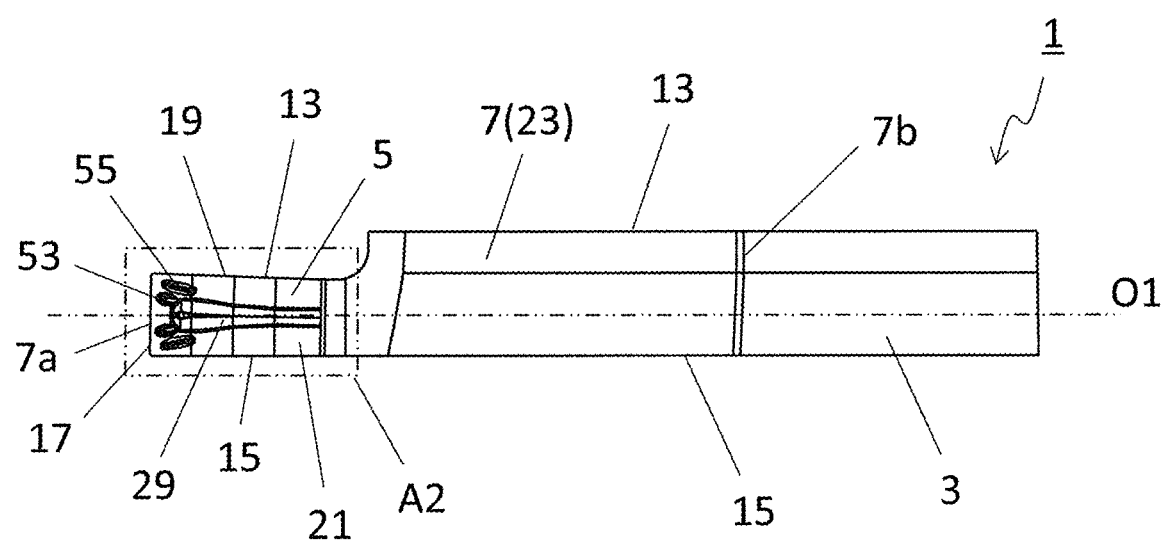
FIG. 2 is a plan view of the cutting insert illustrated in FIG. 1 as viewed from a side of an upper surface.
Figure 3:
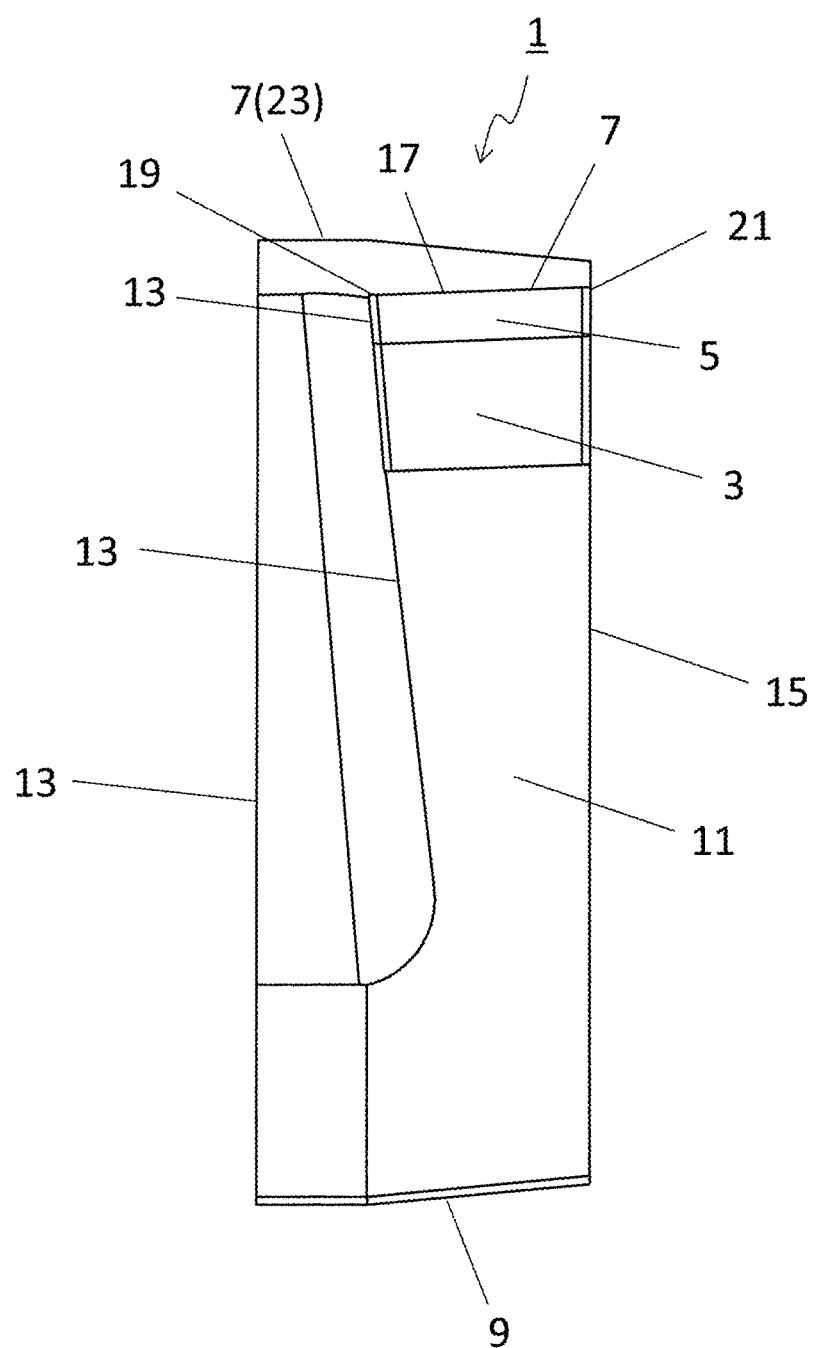
FIG. 3 is a plan view of the cutting insert illustrated in FIG. 1 as viewed from a side of a front end surface.
Figure 4:
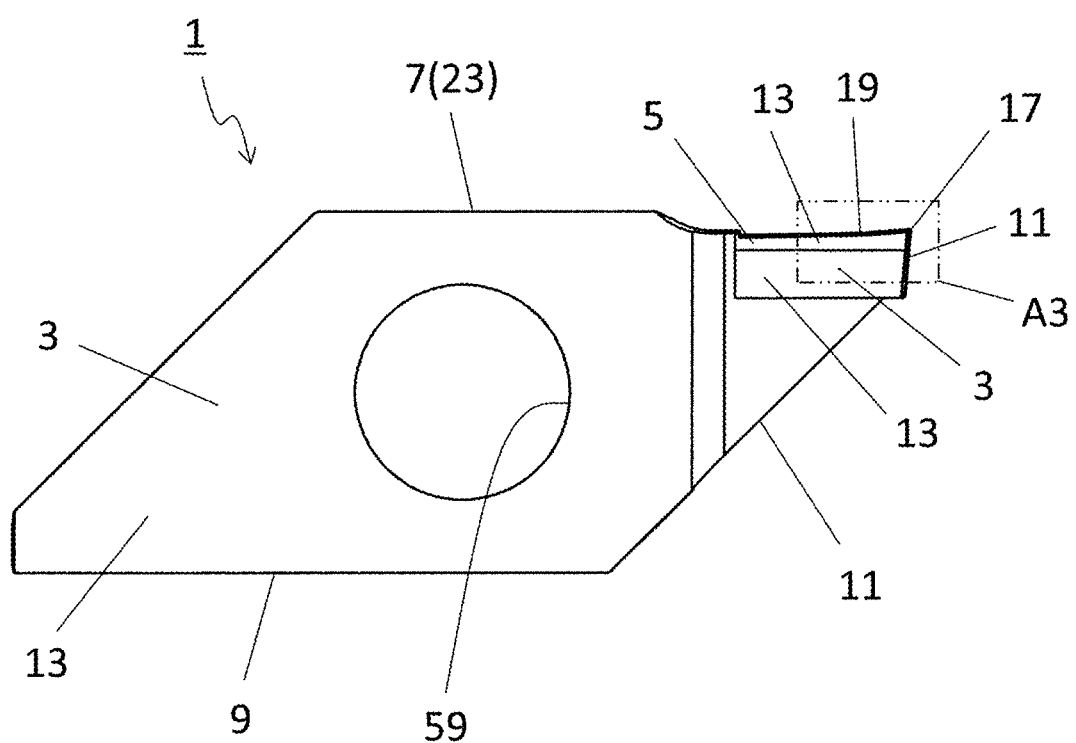
FIG. 4 is a plan view of the cutting insert illustrated in FIG. 1 as viewed from a side of a first lateral surface.
Figure 5:
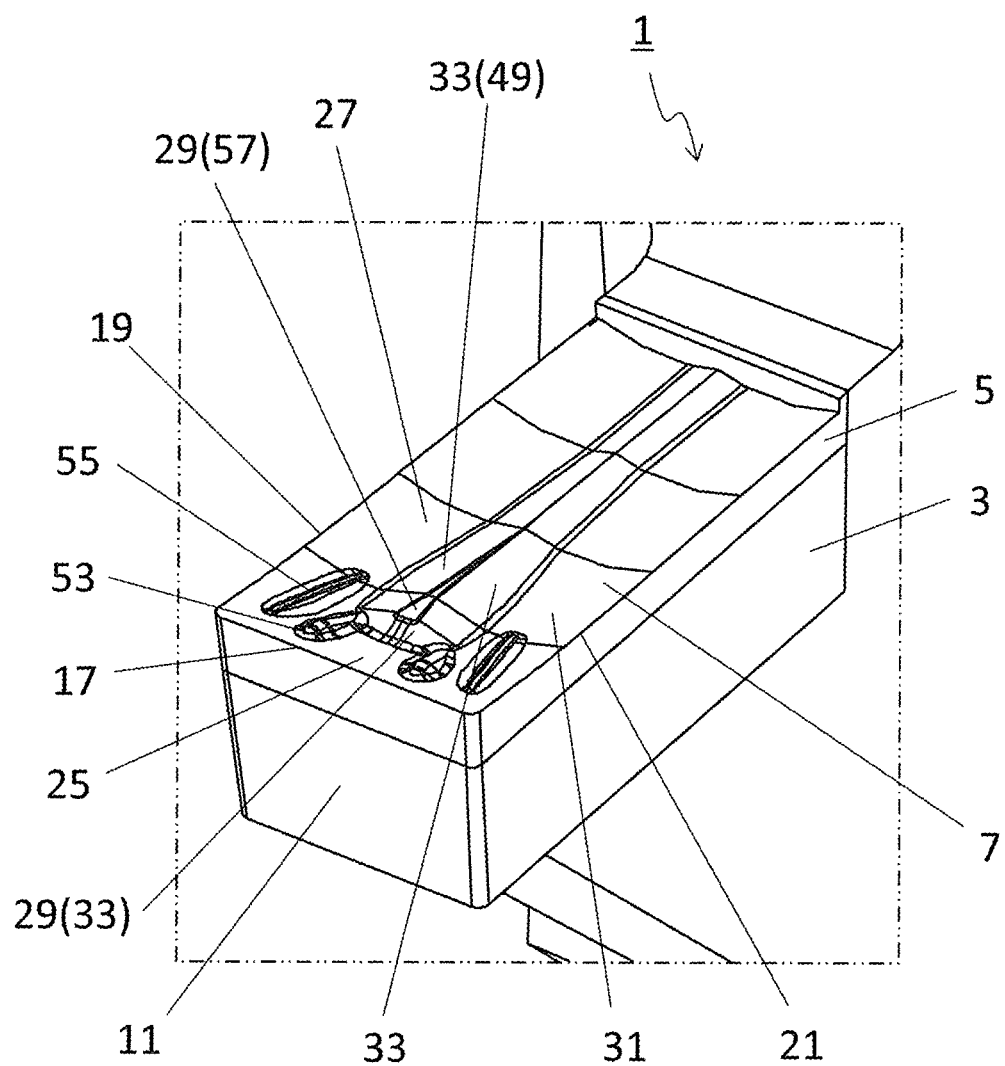
FIG. 5 is an enlarged view of a region A1 illustrated in FIG. 1.

As illustrated in FIG. 1, the insert 1 may include an upper surface 7, a lower surface 9, a front end surface 11, a first lateral surface 13, a second lateral surface 15, a front cutting edge 17, a first lateral cutting edge 19 and a second lateral cutting edge 21. The upper surface 7 may have a polygonal shape as illustrated in FIG. 1. The upper surface 7 may have a quadrangular shape in a plan view (top view) of the upper surface 7 as illustrated in FIG. 2.

As used herein, the term "polygonal shape" is not limited to a strict polygonal shape. For example, at least one of four corners of the upper surface 7 may be rounded and slightly protruded outward in a top view.

Four sides are not limited to those having a strict straight line shape in a top view. For example, at least one of the four sides may have a shape slightly protruded outward or a slightly recessed shape.

The lower surface 9 may be a surface located on a side opposite to the upper surface 7, and may have a polygonal shape. Similarly to the upper surface 7, the lower surface 9 may have, for example, a quadrangular shape. The lower surface 9 may be parallel to the upper surface 7, or may be inclined relative to the upper surface 7. The lower surface 9 may be parallel to a flat surface 23 included in the upper surface 7 as in the embodiment illustrated in FIG. 1.

The front end surface 11, the first lateral surface 13 and the second lateral surface 15 may be individually located between the upper surface 7 and the lower surface 9. The front end surface 11 may connect to the lower surface 9 or may be located away from the lower surface 9. The front end surface 11 may connect to the upper surface 7 and the lower surface 9 as in the embodiment illustrated in FIG. 1.

The first lateral surface 13 and the second lateral surface 15 may be adjacent to the upper surface 7 and the front end surface 11. In this case, the second lateral surface 15 may be located on a side opposite to the first lateral surface 13. The front end surface 11, the first lateral surface 13 and the second lateral surface 15 may have a flat shape or a curved surface shape.

The upper surface 7 may have a rectangular shape extended from a front end 7a (a left side in FIG. 2) toward a rear end 7b (a right side in FIG. 2) along a first central axis O1. In this case, an intersection of the upper surface 7 and the first lateral surface 13, and an intersection of the upper surface 7 and the second lateral surface 15 may be longer than an intersection of the upper surface 7 and the front end surface 11.

Dimensions of the insert 1 are not particularly limited. For example, a length of the insert 1 in a direction along the first central axis O1 in a top view may be settable to approximately 15-40 mm. A length of the insert 1 in a direction orthogonal to the first central axis O1 in the top view may be settable to approximately 1-8 mm. A length of the insert 1 in the direction orthogonal to the first central axis O1 in a flat view (side view) of the first lateral surface 13 may be settable to approximately 5-12 mm.

If the insert 1 includes the base 3 and the cutting part 5, a length of the cutting part 5 in a direction along the first central axis O1 in a top view may be settable to approximately 0.5-8 mm. A length of the cutting part 5 in a direction orthogonal to the first central axis O1 in the top view may be settable to approximately 0.5-8 mm. A length of the cutting part 5 in a direction orthogonal to the first central axis O1 in a side view of the first lateral surface 13 may be settable to approximately 0.2-0.8 mm.

The cutting part 5 may include, as a cutting edge, a front cutting edge 17, a first lateral cutting edge 19 and a second lateral cutting edge 21. The front cutting edge 17 may be located on an intersection of the upper surface 7 and the front end surface 11. Specifically, the front cutting edge 17 may be located on the whole or a part of an intersection of the upper surface 7 and the front end surface 11.

The first lateral cutting edge 19 may be located on an intersection of the upper surface 7 and the first lateral surface 13. The first lateral cutting edge 19 may be located on the whole or a part of the intersection of the upper surface 7 and the first lateral surface 13.

The second lateral cutting edge 21 may be located on an intersection of the upper surface 7 and the second lateral surface 15. The second lateral cutting edge 21 may be located on the whole or a part of the intersection of the upper surface 7 and the second lateral surface 15.

The upper surface 7 may include a front rake surface 25, a first lateral rake surface 27 and a breaker protrusion 29. The front rake surface 25 may be located along the front cutting edge 17, and may come closer to the lower surface 9 as going away from the front cutting edge 17. The front rake surface 25 may be a region where chips generated by the front cutting edge 17 (hereinafter referred to as first chips for the sake of convenience) go through.

If the front cutting edge 17 is inclined as described above, the first chips may tend to go forward in a direction away from the front cutting edge 17. The first chips may therefore be less likely to be caught in the vicinity of the front cutting edge 17. If the upper surface 7 includes the front rake surface 25, the front end surface 11 may serve as a flank surface.

The first lateral rake surface 27 may be located along the first lateral cutting edge 19, and may come closer to the lower surface 9 as going away from the first lateral cutting edge 19. The first lateral rake surface 27 may be a region where chips generated by the first lateral cutting edge 19 (hereinafter referred to as second chips for the sake of convenience) go through.

If the first lateral surface 27 is inclined as described above, the second chips may tend to go forward in a direction away from the first lateral cutting edge 19. The second chips may therefore be less likely to be caught in the vicinity of the first lateral cutting edge 19. If the upper surface 7 includes the first lateral rake surface 27, the first lateral surface 13 may serve as a flank surface.

The upper surface 7 may further include a second lateral rake surface 31. The second lateral rake surface 31 may be located along the second lateral cutting edge 21, and may come closer to the lower surface 9 as going away from the second lateral cutting edge 21. The second lateral rake surface 31 may be a region where chips generated by the second lateral cutting edge 21 go through. If the upper surface 7 includes the second lateral rake surface 31, the second lateral surface 15 may serve as a flank surface.

The breaker protrusion 29 may be located further away from the first lateral cutting edge 19 than the first lateral rake surface 27. The breaker protrusion 29 may be protruded in a direction away from the lower surface 9, and may be extended along the first lateral rake surface 27. The breaker protrusion 29 may serve to curve the second chips. It may be easy to avoid the second chips from extending too long by curving the second chips. The breaker protrusion 29 may serve to curve the first chips.

The breaker protrusion 29 may include an inclined surface 33 and an upper end surface 57 as in the embodiment illustrated in FIG. 1. The inclined surface 33 may be located along the front rake surface 25, the first lateral rake surface 27 and the second lateral rake surface 31, and may be inclined so as to separate from the lower surface 9 as going away from these rake surfaces.

The upper end surface 57 may be a flat surface located along the inclined surface 33 and parallel to the lower surface 9. In other words, the breaker protrusion 29 may include the upper end surface 57 that is flat, and the inclined surface 33 located between the upper end surface 57 and the rake surface described above.

The first lateral cutting edge 19 may include an inclined part 35 which is closer to the lower surface 9 as going away from the front cutting edge 17. If the first lateral cutting edge 19 includes the inclined part 35, it may be possible to reduce cutting resistance exerted on the first lateral cutting edge 19. Also, if the first lateral cutting edge 19 includes the inclined part 35, the second chips may tend to go forward in a direction away from the front cutting edge 17. The first chips and the second chips may therefore be less likely to become tangled, thereby improving dischargeability for these chips.

The breaker protrusion 29 may include a first region 37, a second region 39 and a third region 41. In a side view from a side of the first lateral surface 13, the first region 37 may be located further away from the lower surface 9 than the inclined part 35. The second region 39 may be located closer to the front cutting edge 17 than the first region 37, and may be located closer to the lower surface 9 than the inclined part 35. The third region 41 may be located further away from the front cutting edge 17 than the first region 37, and may be located closer to the lower surface 9 than the inclined part 35.

If the breaker protrusion 29 includes the first region 37, the second chips, which are generated by the first lateral cutting edge 19 and go forward on the first lateral rake surface 27, can be stably curved on the first region 37.

If the breaker protrusion 29 includes the second region 39, it may be possible to stably ensure space for the front rake surface 25. The first chips and the second chips may be less likely to be caught in the vicinity of the front cutting edge 17 in a cutting process at a low feed rate, such as in a cutting process using only the front cutting edge 17, and in a cutting process using only a part of the front cutting edge 17 and a part of the first lateral cutting edge 19 which are located along the second region 39.

Additionally, the first chips may tend to stably come into contact with the inclined surface 33 of the breaker protrusion 29. Consequently, it may be easy to avoid the first chips from climbing over the breaker protrusion 29 and extending too long.

If the breaker protrusion 29 includes the third region 41, the second chips may be less likely to be caught in the vicinity of the first lateral cutting edge 19. If a cutting process is carried out using a part of the first lateral cutting edge 19 which is located along the third region 41 in addition to the parts respectively along the first region 37 and the second region 39, the second chips may tend to have a large width.

If the breaker protrusion 29 includes the third region 41, the second chips generated at a part of the first lateral cutting edge 19 which is located along the third region 41 may tend to climb over the breaker protrusion 29. This may contribute to avoiding excessively enhanced breaking effect by the breaker protrusion 29, thereby improving dischargeability for the second chips.

If the third region 41 is located further away from the front cutting edge 17 than the first region 37, chips generated at a part of the first lateral cutting edge 19 which is located along the first region 37 may tend to be pulled by chips generated at the part of the first lateral cutting edge 19 which is located along the third region 41. Therefore, the second chips may tend to go forward in a direction away from the front cutting edge 17. Consequently, a finished surface of a workpiece formed by the front cutting edge 17 may be less prone to damage.

The inclined part 35 of the first lateral cutting edge 19 may include a first site 43, a second site 45 and a third site 47. The first site 43 may have a concave curvilinear shape in a side view from a side of the first lateral surface 13. The second site 45 may be located closer to the front cutting edge 17 than the first site 43. The third site 47 may be located further away from the front cutting edge 17 than the first site 43.

The second site 45 and the third site 47 may have a straight line shape in a side view from a side of the first lateral surface 13. An inclination angle θ1 of the second site 45 relative to the lower surface 9 may be larger than an inclination angle θ2 of the third site 47 relative to the lower surface 9.

If the second site 45, which is located relatively near the front cutting edge 17 in the inclined part 35, that is, near the front end 7a of the insert 1, has a relatively large inclination angle θ1, it may be possible to reduce chatter vibration during a cutting process.

In cases where the inclined part 35 does not have a large inclination angle as a whole, but the third site 47 located relatively away from the front cutting edge 17 in the inclined part 35 has a relatively small inclination angle θ2, it may be easy to ensure a large thickness between the lower surface 9 and the third site 47 in the insert 1. This may lead to enhanced durability of the insert 1.

In cases where the first site 43 having the concave curvilinear shape is located between the second site 45 and the third site 47, the first site 43, the second site 45 and the third site 47 smoothly connect to each other. Cutting load may therefore be less likely to be concentrated at a specific portion of the inclined part 35.

Figure 6:
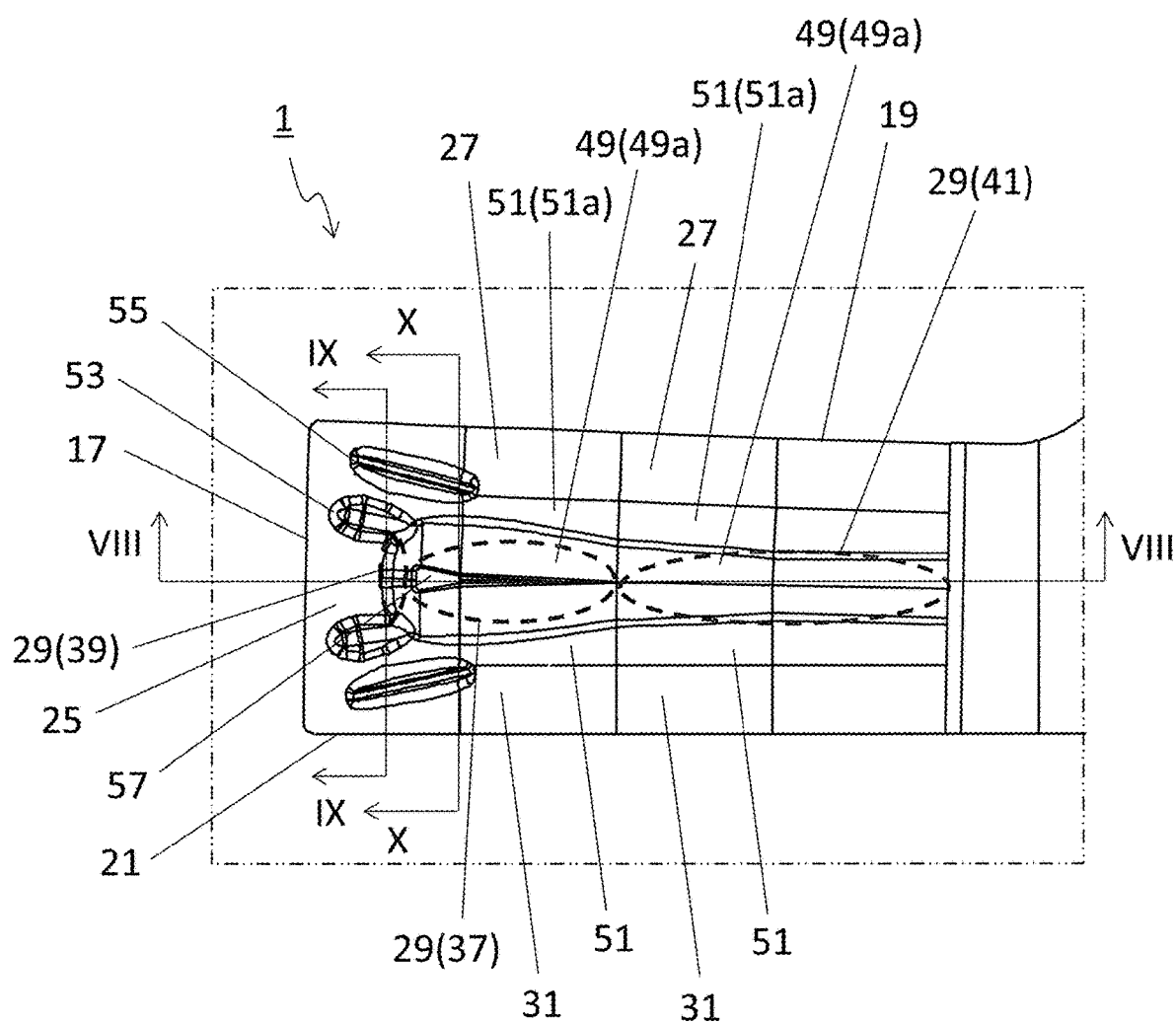
FIG. 6 is an enlarged view of a region A2 illustrated in FIG. 2.
Figure 7:
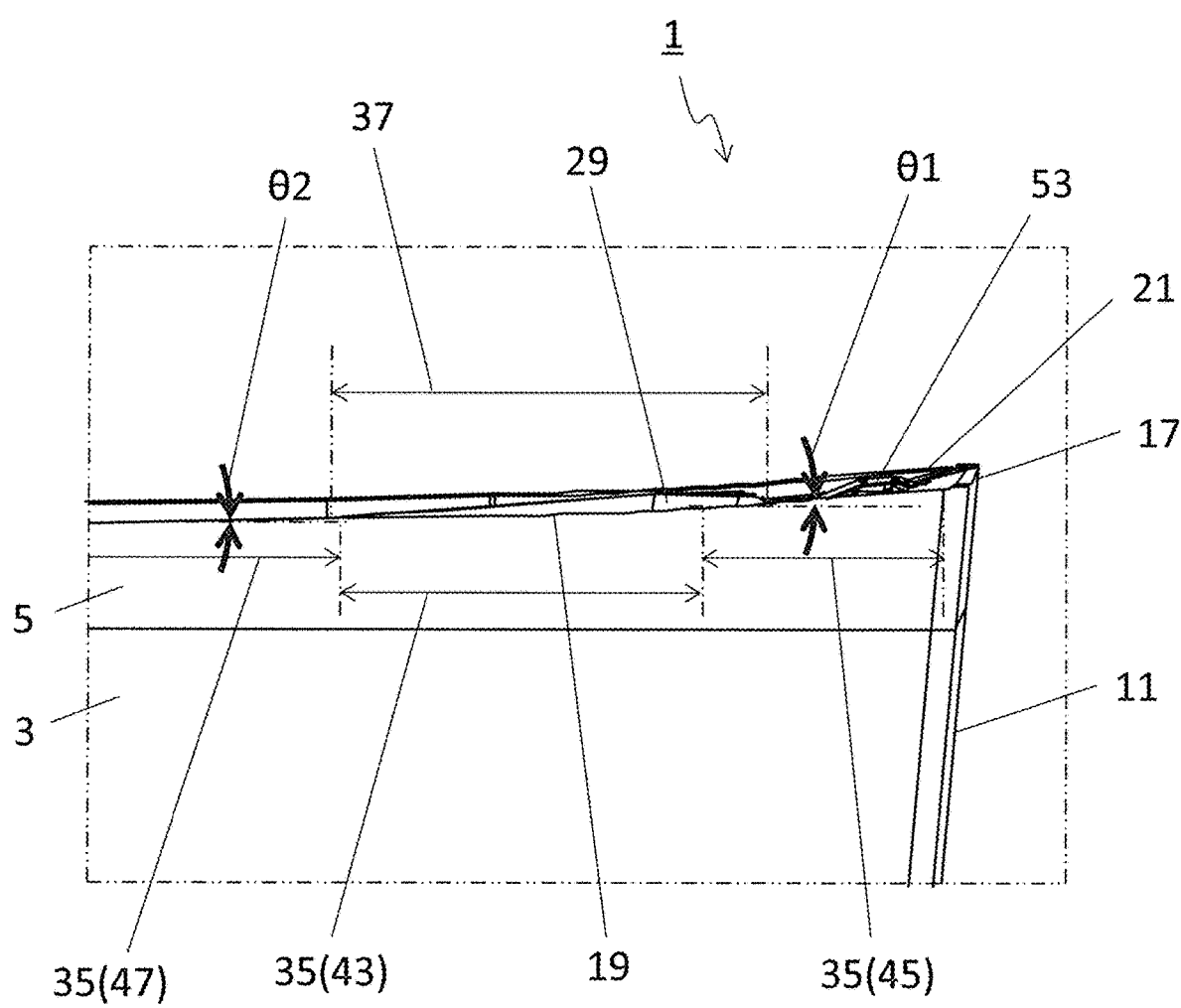
FIG. 7 is an enlarged view of a region A3 illustrated in FIG. 4.

If the inclined part 35 includes the first site 43, the second site 45 and the third site 47, the first region 37 may be located closer to the front cutting edge 17 than the third site 47 as an embodiment illustrated in FIG. 6. A thickness of chips generated at the third site 47 having the relatively small inclination angle θ2 may be larger than a thickness of chips generated at the second site 45 having the relatively large inclination angle θ1.

In cases where the first region 37 located further away from the lower surface 9 than the inclined part 35 is located closer to the front cutting edge 17 than the third site 47, chips generated at the third site 47 that has a large thickness and is prone to clogging may tend to climb over the breaker protrusion 29. Hence, chip clogging may be less likely to occur.

Figure 8:
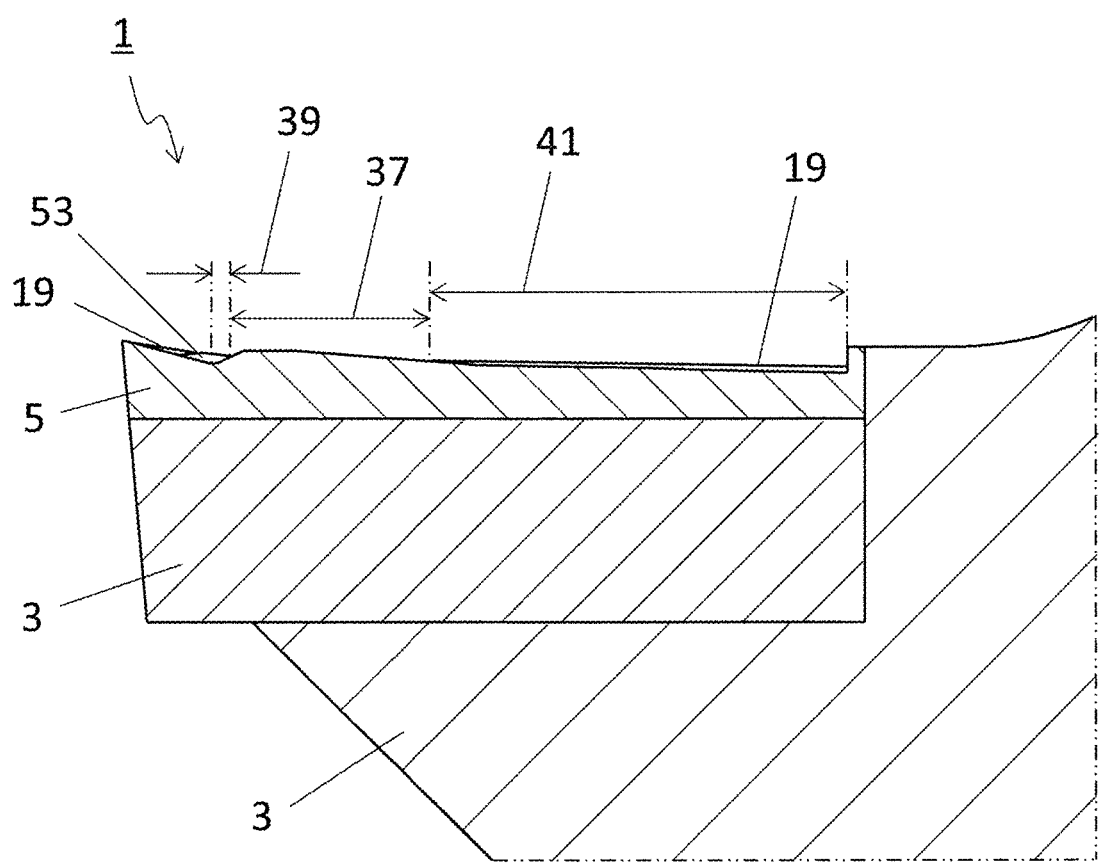
FIG. 8 is an enlarged view of a cross section taken along the line VIII-VIII in a turning tool illustrated in FIG. 6.
Figure 9:
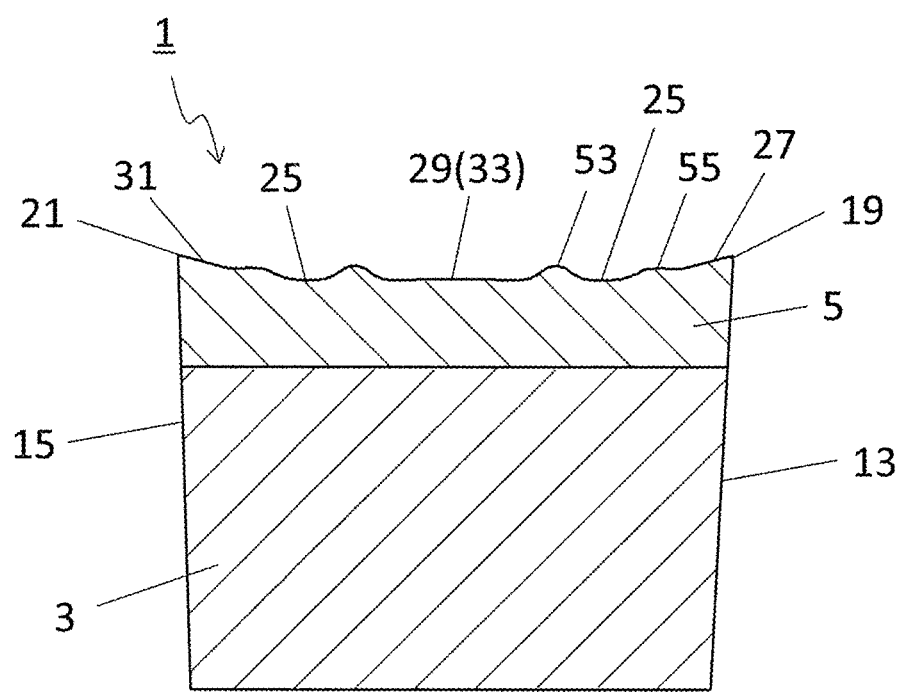
FIG. 9 is an enlarged view of a cross section taken along the line IX-IX in the turning tool illustrated in FIG. 6.
Figure 10:
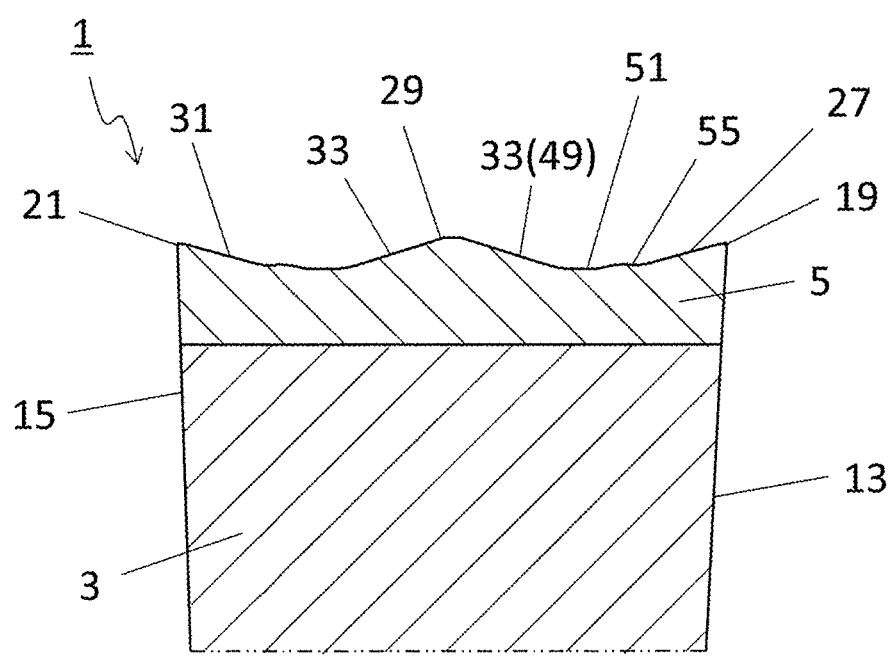
FIG. 10 is an enlarged view of a cross section taken along the line X-X in the turning tool illustrated in FIG. 6.

Alternatively, the first region 37 may be located at the first site 43 in a side view from a side of the first lateral surface 13 as in an embodiment illustrated in FIG. 8. This may make it possible to more stably ensure the space for the front rake surface 25. Consequently, the chip clogging may be much less likely to occur in the vicinity of the front cutting edge 17 during the cutting process at the low feed rate.

The inclined surface 33 in the breaker protrusion 29 may include a first breaker wall surface 49 located along the first rake surface. In other words, the breaker protrusion 29 may include the first breaker wall surface 49 located away from the lower surface 9 as going away from the first lateral rake surface 27.

The first breaker wall surface 49 may include a first part 49a whose width in a direction parallel to the front cutting edge 17 decreases as going away from the front cutting edge 17 in a top view.

The first part 49a may be located at the third region 41 in the breaker protrusion 29. If the first part 49a whose width in the direction parallel to the front cutting edge 17 decreases is located at the third region 41, chips generated at a part of the first lateral cutting edge 19 which is located along the third region 41 may further tend to climb over the breaker protrusion 29.

The upper surface 7 may further include a bottom surface 51 parallel to the lower surface 9. The bottom surface 51 may be located between the first lateral rake surface 27 and the breaker protrusion 29. The bottom surface 51 may include a second part 51a whose width in a direction parallel to the front cutting edge 17 increases as going away from the front cutting edge 17 in a top view. The second part 51a may be located along the third region 41 in the breaker protrusion 29.

If the second part 51a whose width in the direction parallel to the front cutting edge 17 increase is located along the third region 41, it may be easy to ensure a large width of a breaker groove formed by the first lateral rake surface 27, the second part 51a and the third region 41. Therefore, chips generated at a part of the first lateral cutting edge 19 which is located along the third region 41 may further tend to climb over the breaker protrusion 29.

The upper surface 7 may further include a first sub breaker protrusion 53 and a second sub breaker protrusion 55. The first sub breaker protrusion 53 may be extended from the breaker protrusion 29 toward the front cutting edge 17 in a top view.

The second sub breaker protrusion 55 may be located between the first sub breaker protrusion 53 and the first lateral cutting edge 19, and may be extended along the first sub breaker protrusion 53. The first sub breaker protrusion 53 and the second sub breaker protrusion 55 may be located closer to the first lateral cutting edge 19 than the first central axis O1 in a top view as in the embodiment illustrated in FIG. 6.

An upper end of the first sub breaker protrusion 53 and an upper end of the second sub breaker protrusion 55 may be lower than the upper end surface 57 of the breaker protrusion 29. As used herein, the term "lower" may denote being a small height from the lower surface 9.

If including the first sub breaker protrusion 53 and the second sub breaker protrusion 55, both of which include an upper end that is lower than the upper end surface 57 of the breaker protrusion 29, a direction in which the first chips go through may be easily controllable by the first sub breaker protrusion 53 and the second sub breaker protrusion 55 while ensuring the space for the front rake surface 25.

The first sub breaker protrusion 53 may be located away from the breaker protrusion 29, or may be in contact with the breaker protrusion 29. If the first sub breaker protrusion 53 is in contact with the breaker protrusion 29 as in the embodiment illustrated in FIG. 6, the first chips which are generated by the front cutting edge 17 and go through the first sub breaker protrusion 53 may tend to smoothly go forward to the breaker protrusion 29. The first chips may therefore be less likely to be stagnant when going through the first sub breaker protrusion 53 and the breaker protrusion 29.

The second sub breaker protrusion 55 may be located away from the breaker protrusion 29, or may be in contact with the breaker protrusion 29. If the second sub breaker protrusion 55 is located away from the breaker protrusion 29 as in the embodiment illustrated in FIG. 6, the second chips may tend to come into contact with the second sub breaker protrusion 55 and the breaker protrusion 29 in a stepwise manner.

Consequently, the second chips can be stably curved by the second sub breaker protrusion 55 and the breaker protrusion 29. This makes it difficult for the second chips to go through to the finished surface of the workpiece formed by the front cutting edge 17, and the finished surface may therefore be less prone to damage.

The first sub breaker protrusion 53 may extend closer to the front cutting edge 17 than the second sub breaker protrusion 55 in a top view. If the first sub breaker protrusion 53 extends relatively close to the front cutting edge 17, the direction in which the first chips go through may be easily controllable by the first sub breaker protrusion 53.

If the second sub breaker protrusion 55 is located relatively away from the front cutting edge 17, it may be easy to ensure space including no protrusion in the vicinity of a corner where the front cutting edge 17 intersects with the first lateral cutting edge 19 on the upper surface 7. The first chips and the second chips may therefore be less likely to be stagnant.

The second sub breaker protrusion 55 may be extended to a region further away from the front cutting edge 17 than the first sub breaker protrusion 53 in a top view. If the second sub breaker protrusion 55 is located away from the breaker protrusion 29 as in the embodiment illustrated in FIG. 6, the second chips may tend to come into contact with the second sub breaker protrusion 55 and the breaker protrusion 29 in a stepwise manner.

In cases where the inclined part 35 of the first lateral cutting edge 19 includes the first site 43, the second site 45 and the third site 47, the first sub breaker protrusion 53 and the second sub breaker protrusion 55 may be located inside the second site 45 in a top view as illustrated in FIG. 6. That is, the first sub breaker protrusion 53 and the second sub breaker protrusion 55 may be located closer to the front cutting edge 17 than the first site 43 in the direction along the first central axis O1.

Because the first site 43 has the concave curvilinear shape, chips generated at the first site 43 may be more likely to be stagnant than chips generated at the second site 45 and the third site 47. However, if the first sub breaker protrusion 53 and the second sub breaker protrusion 55 are located as described above, chips generated at the first site 43 of the first lateral cutting edge 19 may be less likely to be stagnant.

The breaker protrusion 29 may be located on a bisector of the front cutting edge 17 in a top view as illustrated in FIG. 6. In other words, the breaker protrusion 29 may be located on the first central axis O1 in the top view as illustrated in FIG. 6. This makes it easier to ensure space for the second lateral rake surface 31. Therefore, in a cutting process using the second lateral cutting edge 21 instead of the first lateral cutting edge 19, it may be easy to avoid chips generated by the second cutting edge 21 from extending too long.

The insert 1 may include a through hole 59 that opens into the first lateral surface 13 and the second lateral surface 15 as illustrated in FIG. 1 or the like. The through hole 59 may be formed from a center of the first lateral surface 13 toward a center of the second lateral surface 15 as in the embodiment illustrated in FIG. 1.

The through hole 59 may be usable for inserting, for example, a screw when fixing the insert 1 to the holder. The insert 1 may be attached to the holder 3 by inserting the screw into the through hole 59 of the insert 1, and by inserting a front end of the screw into a screw hole formed in the holder so as to fix the screw to the screw hole. When fixing the insert 1 to the holder, a clamping member may be used instead of the screw.

<Cutting Tools>

Cutting tools 101 in non-limiting embodiments of the present disclosure may be described below with reference to the drawings.

Figure 11:
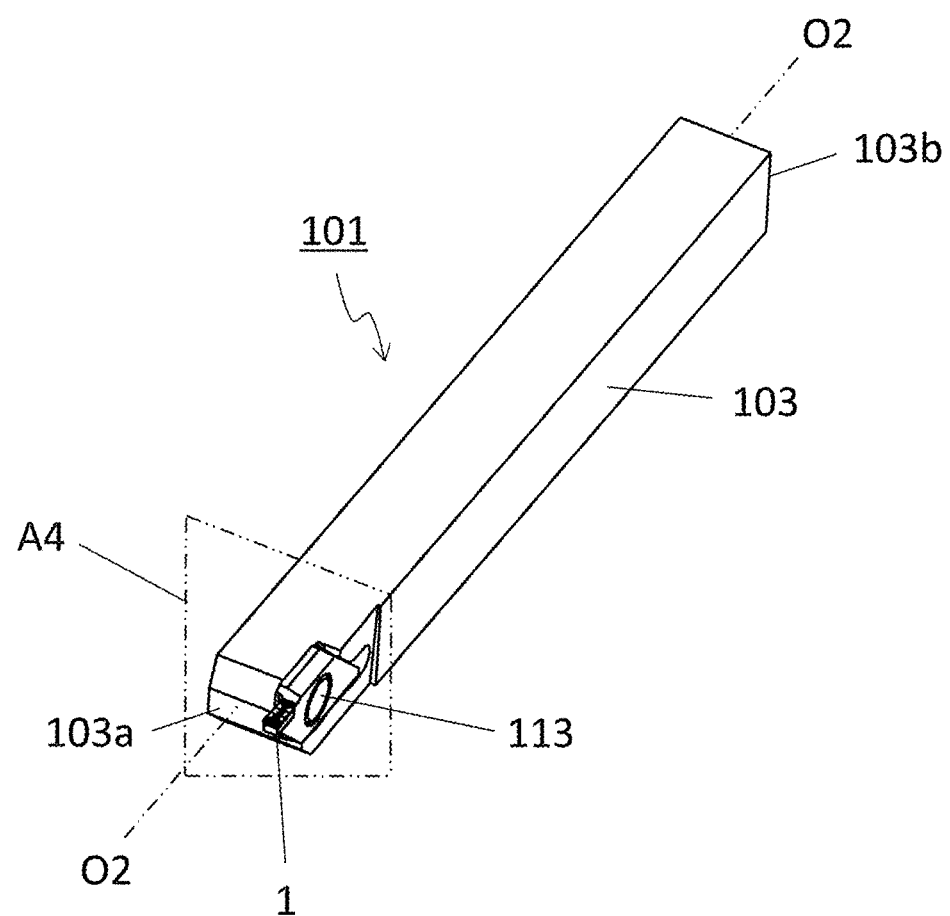
FIG. 11 is a perspective view illustrating a cutting tool in a non-limiting embodiment.

The cutting tool 101 of one of the non-limiting embodiments may include a holder 103 and an insert 1. The holder 103 may have a bar shape extended from a first end 103a (a lower left end in FIG. 11) to a second end 103b (an upper right end in FIG. 11) along a second central axis O2 as illustrated in FIG. 11. Alternatively, the holder 103 may include a pocket 105 and a screw hole.

Figure 12:
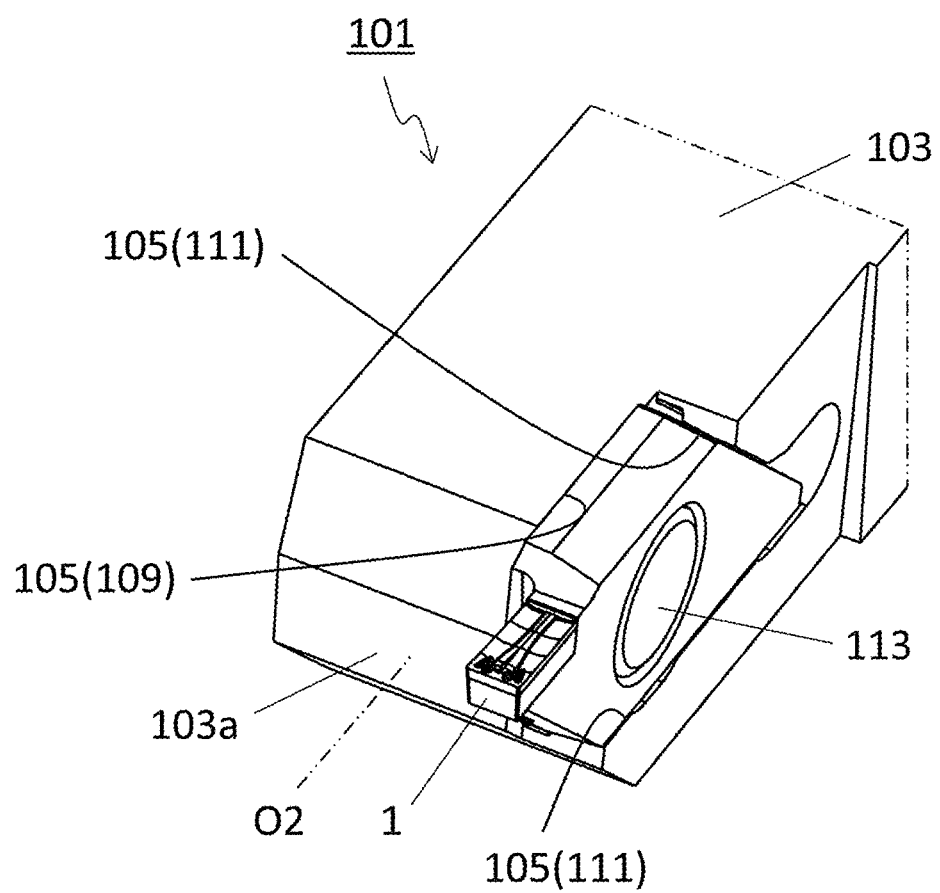
FIG. 12 is an enlarged view of a region A4 illustrated in FIG. 11.

The pocket 105 may be a part which permits attachment of the insert 1 and may be located on a side of the first end 103a in the holder 103. The pocket 105 may be located so as to include the first end 103a of the holder 103 as in an embodiment illustrated in FIG. 12. Accordingly, the pocket 105 may open into the first end 103a as in the embodiment illustrated in FIG. 12.

The pocket 105 may include a mounting surface 109 and a constraining surface 111 as a surface against which the insert 1 abuts. The constraining surface 111 may be inclined relative to the mounting surface 109. This makes it possible to distinguish the mounting surface 109 from the constraining surface 111 in the pocket 105. The mounting surface 109 may be extended parallel to the second central axis O2. The constraining surface 111 may be inclined relative to the second central axis O2.

The screw hole may be a hole that permits insertion of the screw 113 for fixing the insert 1 to the holder 103. The screw hole may open into the pocket 105. For example, the screw hole may open into the mounting surface 109.

For example, steel, cast iron and aluminum alloy may usable as a material constituting the holder 103. Of these materials, the use of steel may particularly contribute to enhancing toughness of the holder 103. Dimensions of the holder 103 may be properly set according to dimensions of a workpiece.

The cutting tool 101 for use in a so-called turning process may be illustrated in the embodiment illustrated in FIG. 11. The cutting tools 101 in the non-limiting embodiments may be usable for a grooving process, but the use thereof is not limited thereto. There is no problem even if the cutting tools 101 are used for an inner diameter process, an outer diameter process and a traversing process.

<Methods for Manufacturing Machined Product>

Methods for manufacturing a machined product in non-limiting embodiments of the present disclosure may be described below with reference to the drawings.

The machined product 201 may be manufacturable by carrying out a cutting process of a workpiece 203. The non-limiting embodiments may illustrate a grooving process as the cutting process. The methods for manufacturing the machined product 201 in the non-limiting embodiments may include the following steps:

(1) rotating the workpiece 203;
(2) bringing the cutting tool 101 represented by the above non-limiting embodiments into contact with the workpiece 203 being rotated; and
(3) moving the cutting tool 101 away from the workpiece 203.

Figure 13:
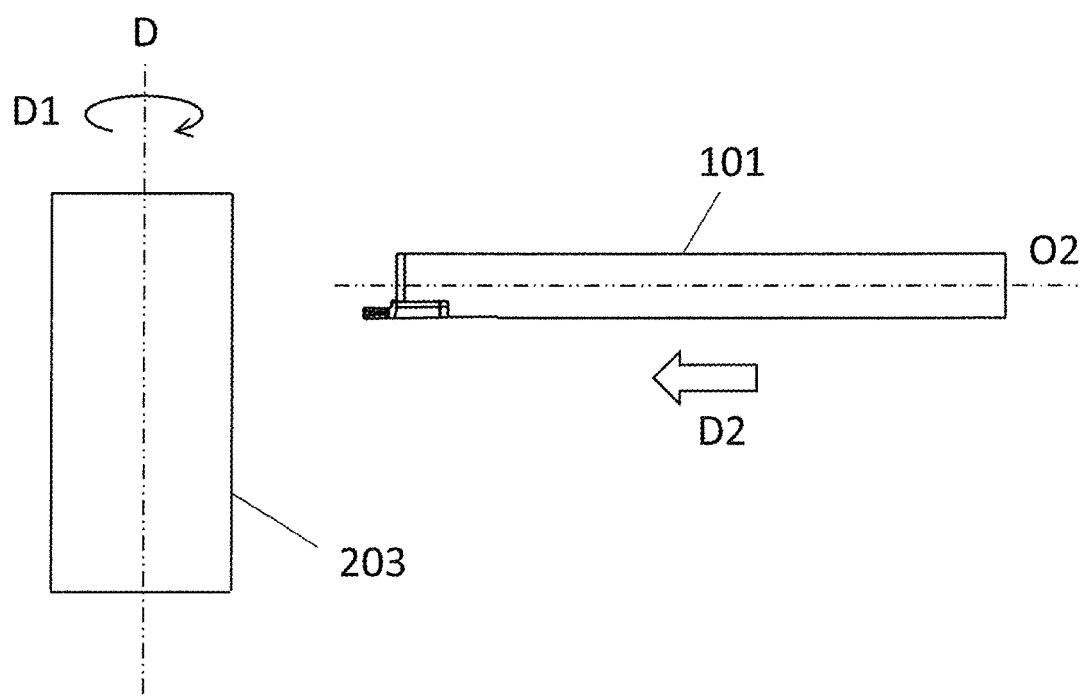
FIG. 13 is a schematic diagram illustrating one of steps in a method for manufacturing a machined product in a non-limiting embodiment.
Figure 14:
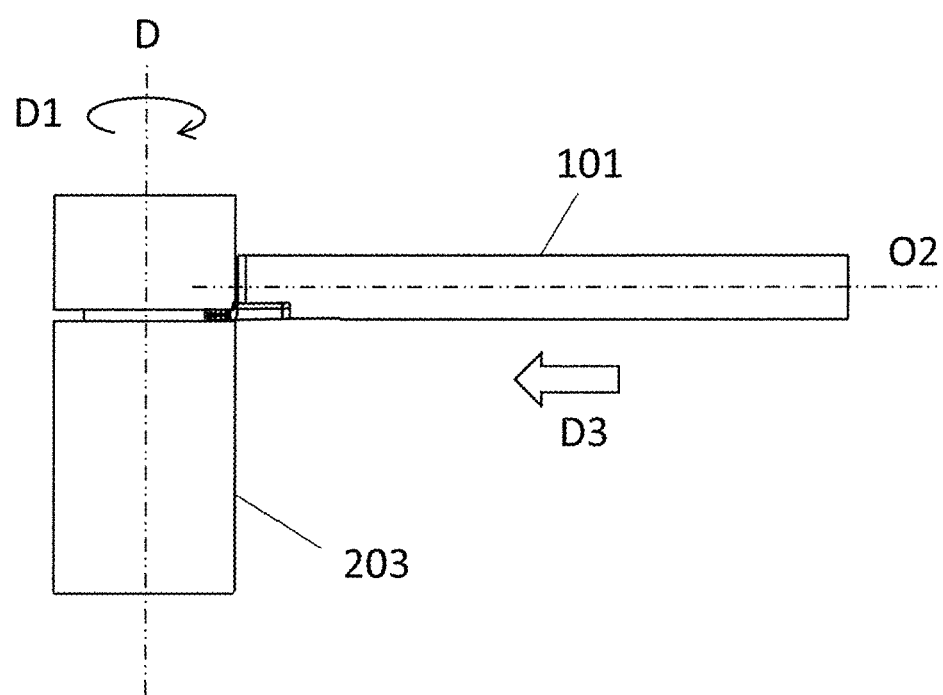
FIG. 14 is a schematic diagram illustrating one of the steps in the method for manufacturing a machined product in the non-limiting embodiment.

More specifically, firstly, the workpiece 203 may be rotated in a D1 direction around an axis D as illustrated in FIG. 13. The cutting tool 101 may be relatively brought near the workpiece 203 by moving the cutting tool 101 in a D2 direction. Subsequently, the workpiece 203 may be cut out by bringing the first cutting edge in the cutting tool 101 into contact with the workpiece 203 as illustrated in FIG. 14.

Figure 15:
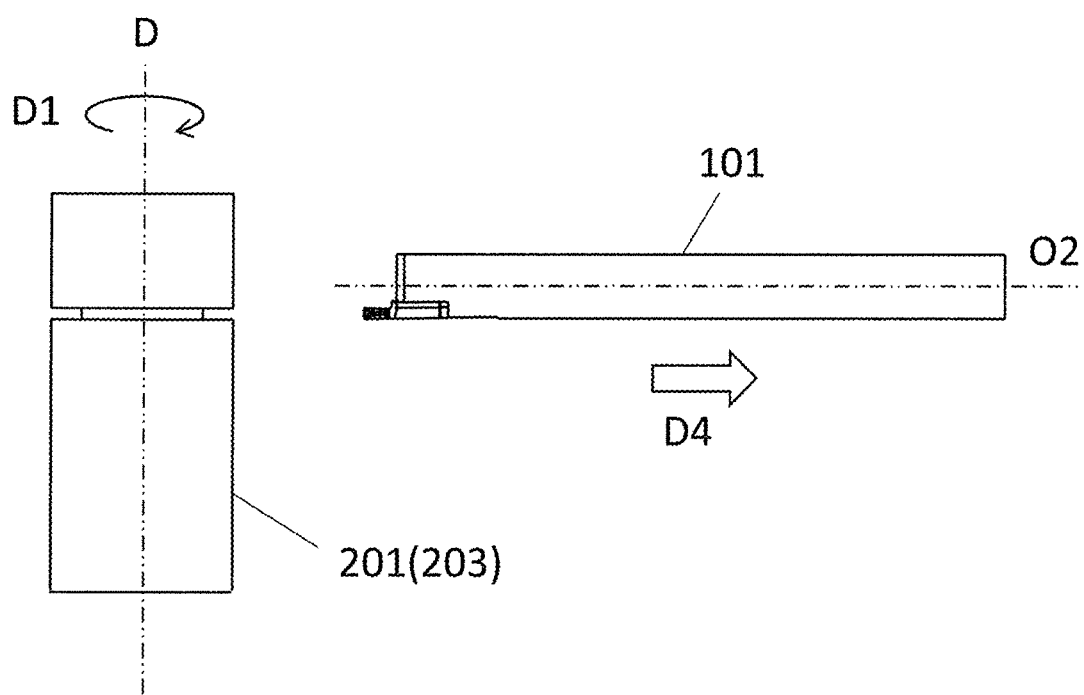
FIG. 15 is a schematic diagram illustrating one of the steps in the method for manufacturing a machined product in the non-limiting embodiment.

In this case, the grooving process can be carried out by cutting out the workpiece 203 while moving the cutting tool 101 in a D3 direction. The cutting tool 101 may be relatively moved away from the workpiece 203 by moving the cutting tool 101 in a D4 direction as illustrated in FIG. 15.

The cutting tool 101 may be brought near the workpiece 203 in a state where the axis D is fixed and the workpiece 203 is rotated as illustrated in FIG. 13. The workpiece 203 may be cut out by bringing the front cutting edge of the insert into contact with the workpiece 203 being rotated, as illustrated in FIG. 14. The cutting tool 101 may be moved away in a state where the workpiece 203 is rotated as illustrated in FIG. 15.

In the cutting process with the manufacturing method in the non-limiting embodiments, the cutting tool 101 may be brought into contact with the workpiece 203 by moving the cutting tool 101. The cutting tool 101 may be moved away from the workpiece 203 by moving the cutting tool 101. However, the manufacturing method of the embodiments is not limit to this embodiment.

For example, the workpiece 203 may be brought near the cutting tool 101 in the step (1). Similarly, the workpiece 203 may be moved away from the turning tool 101 in the step (3). If it is desired to continue the cutting process, the step of bringing the cutting edge of the insert into contact with different portions of the workpiece 203 may be repeated while keeping the workpiece rotated.

Representative examples of material of the workpiece 203 may include carbon steel, alloy steel, stainless steel, cast iron or nonferrous metals.

The invention claimed is:

1. A cutting insert, comprising:
   an upper surface;
   a lower surface located on a side opposite to the upper surface;
   a front end surface located between the upper surface and the lower surface;
   a first lateral surface adjacent to the upper surface and the front end surface;
   a second lateral surface which is located on a side opposite to the first lateral surface and is adjacent to the upper surface and the front end surface;
   a front cutting edge located on an intersection of the upper surface and the front end surface;
   a first lateral cutting edge located on an intersection of the upper surface and the first lateral surface; and
   a second lateral cutting edge located on an intersection of the upper surface and the second lateral surface,
   wherein
   the upper surface comprises
      a front rake surface which is located along the front cutting edge and is closer to the lower surface as going away from the front cutting edge,
      a first lateral rake surface which is located along the first lateral cutting edge and is closer to the lower surface as going away from the first lateral cutting edge, and
      a breaker protrusion which is located further away from the first lateral cutting edge than the first lateral rake surface and is extended along the first lateral rake surface,
   the first lateral cutting edge comprises an inclined part which is closer to the lower surface as going away from the front cutting edge, and
   the breaker protrusion comprises, in a side view from a side of the first lateral surface,
      a first region located further away from the lower surface than the inclined part,
      a second region which is located closer to the front cutting edge than the first region and is located closer to the lower surface than the inclined part, and
      a third region which is located further away from the front cutting edge than the first region and is located closer to the lower surface than the inclined part.

2. The cutting insert according to claim 1, wherein
   the inclined part comprises, in a side view from a side of the first lateral surface,
      a first site having a concave curvilinear shape,
      a second site having a straight line shape located closer to the front cutting edge than the first site, and
      a third site having a straight line shape located further away from the front cutting edge than the first site, and
   the first region is located closer to the front cutting edge than the third site.

3. The cutting insert according to claim 2, wherein the first region is located at the first site in a side view from a side of the first lateral surface.

4. The cutting insert according to claim 1, wherein
   the breaker protrusion comprise a first breaker wall surface located further away from the lower surface as going away from the first lateral rake surface, and
   the first breaker wall surface comprises a part whose width in a direction parallel to the front cutting edge decreases as going away from the front cutting edge in a top view.

5. The cutting insert according to claim 1, wherein
   the upper surface further comprises a bottom surface which is located between the first lateral rake surface and the breaker protrusion and is parallel to the lower surface, and
   the bottom surface comprises a part whose width in a direction parallel to the front cutting edge increases as going away from the front cutting edge in a top view.

6. The cutting insert according to claim 1, wherein
   the upper surface further comprises, in a top view,
      a first sub breaker protrusion extended from the breaker protrusion toward the front cutting edge, and
      a second sub breaker protrusion which is located between the first sub breaker protrusion and the first lateral cutting edge and is extended along the first sub breaker protrusion, and
   the second sub breaker protrusion is located away from the breaker protrusion.

7. The cutting insert according to claim 6, wherein the first sub breaker protrusion extends closer to the front cutting edge than the second sub breaker protrusion in a top view.

8. The cutting insert according to claim 6, wherein the second sub breaker protrusion extends closer to a region further away from the front cutting edge than the first sub breaker protrusion in a top view.

9. The cutting insert according to claim 6, wherein
   the inclined part comprises, in a side view from a side of the first lateral surface,
      a first site having a concave curvilinear shape,
      a second site having a straight line shape located closer to the front cutting edge than the first site, and
      a third site having a straight line shape located further away from the front cutting edge than the first site, and
   the first sub breaker protrusion and the second sub breaker protrusion are located inside the second site in a top view.

10. The cutting insert according to claim 1, wherein the breaker protrusion is located on a bisector of the front cutting edge in a top view.

11. A cutting tool, comprising:
    a holder which has a bar shape extended from a first end to a second end along a central axis and comprises a pocket located on a side of the first end; and
    the cutting insert according to claim 1, the cutting insert being located in the pocket.

12. A method for manufacturing a machined product, comprising:
    rotating a workpiece;
    bringing the cutting tool according to claim 11 into contact with the workpiece being rotated; and
    moving the cutting tool away from the workpiece.

* * * * *